United States Patent [19]
Keane et al.

[11] Patent Number: 5,622,315
[45] Date of Patent: Apr. 22, 1997

[54] ADJUSTABLE SLOT GOATING DIE

[75] Inventors: John J. Keane, Alpharetta; Charles H. Scholl, Duluth, both of Ga.

[73] Assignee: Nordson Corporation, Westlake, Ohio

[21] Appl. No.: 404,167

[22] Filed: Mar. 14, 1995

[51] Int. Cl.⁶ .............................. B05B 1/04; B29C 47/14
[52] U.S. Cl. .......................... 239/134; 239/451; 239/597; 239/600
[58] Field of Search .................... 239/597, 600, 239/133–138, 451, 455; 118/410, 411

[56]  References Cited

U.S. PATENT DOCUMENTS

| 1,424,795 | 8/1922 | Bannon ............................. 239/597 X |
| 2,921,748 | 1/1960 | Kane .................................. 239/597 |
| 3,750,955 | 8/1973 | Nakai et al. ...................... 239/597 X |
| 4,200,207 | 4/1980 | Akers et al. . |
| 4,687,137 | 8/1987 | Boger et al. . |
| 4,962,891 | 10/1990 | Layden ............................. 239/597 |
| 5,056,687 | 10/1991 | Claassen ......................... 239/597 X |
| 5,294,258 | 3/1994 | Jarrrell et al. . |

FOREIGN PATENT DOCUMENTS 372902  6/1990  European Pat. Off. ............... 239/597

OTHER PUBLICATIONS

"The Flat Out Best!", Chippewa Valley Die, Inc. Product Line Brochure (6 pages).

Primary Examiner—Kevin Weldon
Attorney, Agent, or Firm—Calfee Halter & Griswold

[57] ABSTRACT

A slot coating die (10) is provided, comprising an upper die half (12) and a lower die half (14) attached together with a shim (16) disposed therebetween, each die half extending along an axis (18) and having a front and a back. The front of the upper die half includes a movable lip insert (22) extending substantially the entire width thereof and movable with respect to the upper die half toward and away from the front of the upper die half in a direction generally perpendicular to the axis. At least one adjustable die opening (20), which is adjustable independently of the movable lip insert, is defined by the upper and lower die halves and the shim plate disposed therebetween. A plurality of push-pull bolts (30) provide a coarse adjustment mechanism for adjusting the relative positions of the lower and upper die halves with respect to each other in a direction generally parallel to that in which the movable lip insert may be moved. A plurality of spring (128) loaded screws (124) spaced along the width of the upper die half provide a fine adjust mechanism by which the lip insert is made movable in that direction.

15 Claims, 12 Drawing Sheets

ADJUSTABLE SLOT COATING DIE

TECHNICAL FIELD

The present invention relates generally to slot coating dies and more particularly to an adjustable slot coating die providing means to adjust the flow characteristics of the die slot independently of a doctoring surface of the die.

BACKGROUND OF THE INVENTION

Hot melt material application devices incorporating slot-type dies are known. Such devices are typically used to continuously apply a coating to a substrate which passes over a coating surface of the die head. Designs for such slot dies must insure that (i) the hot melt material is evenly redistributed from the surface of the die head to the surface of the substrate being coated and (ii) the configuration of the doctoring, or finishing, surface of the die head is carefully controlled.

Controlled redistribution of the hot melt material from the die head surface to the substrate surface is typically accomplished by means of the design of the internal flow passages of the die. Generally, two types of internal flow passage designs are known. The so-called coat hanger dies (e.g. U.S. Pat. No. 4,687,137, assigned to the assignee of the present invention) utilize complex internal machined surfaces which permit the hot melt material to flow from the die head to the substrate in a uniform manner. However, utilizing this type of arrangement generally limits the applications of the die to a limited number of coating widths, and to certain ranges of hot melt material flow and viscosity.

T-slot dies have also experienced widespread use in the industry (see e.g. U.S. Pat. No. 5,294,258, also assigned to the assignee of the present invention). Typically these types of dies can accept a wider range of hot melt material types than coat hanger dies. In addition, T-slot dies may be used for applying varying amounts of hot melt material by merely by changing shim plates on the device. However, known T-slot dies are not as efficient as coat hanger dies in evenly internally distributing the hot melt material from within the die head to the doctoring surface.

Moreover, both known T-slot and known coat hanger dies provide limited control over the configuration of the doctoring surface of the die head to accommodate for variations in the doctoring surface of the die or the surface of the back up roll, or cross-machine variations in the thickness of the substrate being coated.

Accordingly, it is an object of the present invention to provide a die having a head which provides both the even internal flow distribution of a coat hanger die and the flexibility of application and coating width variation a T-slot die. It is an additional object of the invention to provide such a die which will accommodate variations in the doctoring surface of the die, the surface of the back up roll, and the thickness of the substrate.

SUMMARY OF THE PRESENT INVENTION

An adjustable slot coating die is provided which comprises upper and lower die halves secured together and having a replaceable shim of varying thickness therebetween. The thickness of the shim determines the thickness of a die opening through which hot melt material may be dispensed or extruded. The upper and lower halves of the die are disposed in a generally parallel relationship with respect to one another along an end-to-end axis of the die which lies in the plane of the shim.

A removable lip insert or mouthpiece is installed at a front of the upper die half. The frontmost portion of the mouthpiece forms a doctoring surface which works, or doctors, the finish and thickness of the hot melt material as it is being applied to a substrate or web. A series of push-pull bolts are located at the rear of the die for adjusting the relative position of the upper half of the die, and thus the mouthpiece, with respect to the substrate. Selective and independent operation of individual push-pull bolts effects a coarse adjustment of the contour of the doctoring surface of the mouthpiece along the entire end-to-end width of the die.

A supply of hot melt material is provided to the lower die half and communicated across the shim to a cross channel extending the entire end-to-end width of the upper die half. A series of adjustable valve assemblies located at spaced apart locations on the cross channel balance the distribution of hot melt material across exit ports in the upper die half, to T-slots in the lower die half which are formed by elbow-channels which terminate in elongated slots with rounded ends. Hot melt material flows through the series of adjacent T-slots and through the die opening to provide an evenly distributed flow of hot melt material across the opening. In addition to determining the thickness of the die opening, the shim provides means by which the flow of hot melt material present at the T-slots may be selectively blocked to provide a predetermined pattern or variable width of hot melt material flow at the die opening.

The adjustable mouthpiece is secured to the upper die half by means of a series of threaded screws which are provided with springs which are placed under compression when the screws are tightened. When under compression, the compressive force exerted by the springs forces the mouthpiece into contact with the upper die half. A series of tapered screws are used to finely adjust the position of the mouthpiece with respect to the substrate or web being coated. Tapered ends of the screws mate with the back end of the mouthpiece. Rotation of any of the tapered screws counteracts the compressive force exerted by a corresponding spring to force the lip insert away from the die at the location of that particular tapered screw.

DETAILED DESCRIPTION OF THE PREFERRED EMBODIMENT

Referring now to the drawings, FIGS. 1 through 4 show various views of an adjustable slot coating die 10 constructed according to the principles of the present invention. Beginning with FIG. 1, an end view of the slot coating die 10 is shown. The die 10 comprises a upper die half 12 and a lower die half 14 separated by a distance equal to the predetermined thickness (e.g., 0.005"–0.032") of a shim 16 disposed therebetween (see also FIGS. 5A–5B).

Figure 2A:
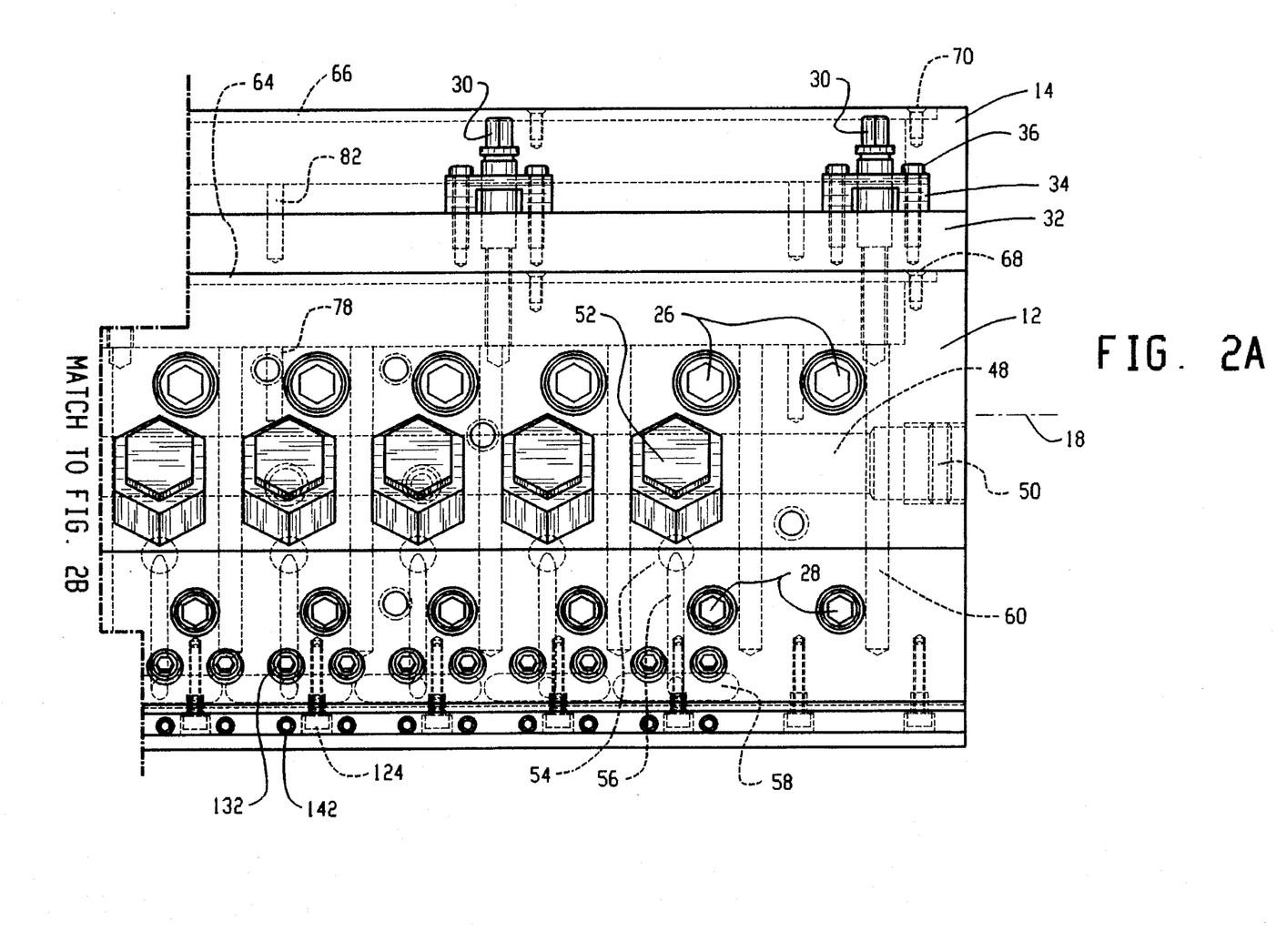
FIGS. 2A and 2B, taken together, form a side view of the adjustable slot coating die of FIG. 1.
Figure 2B:
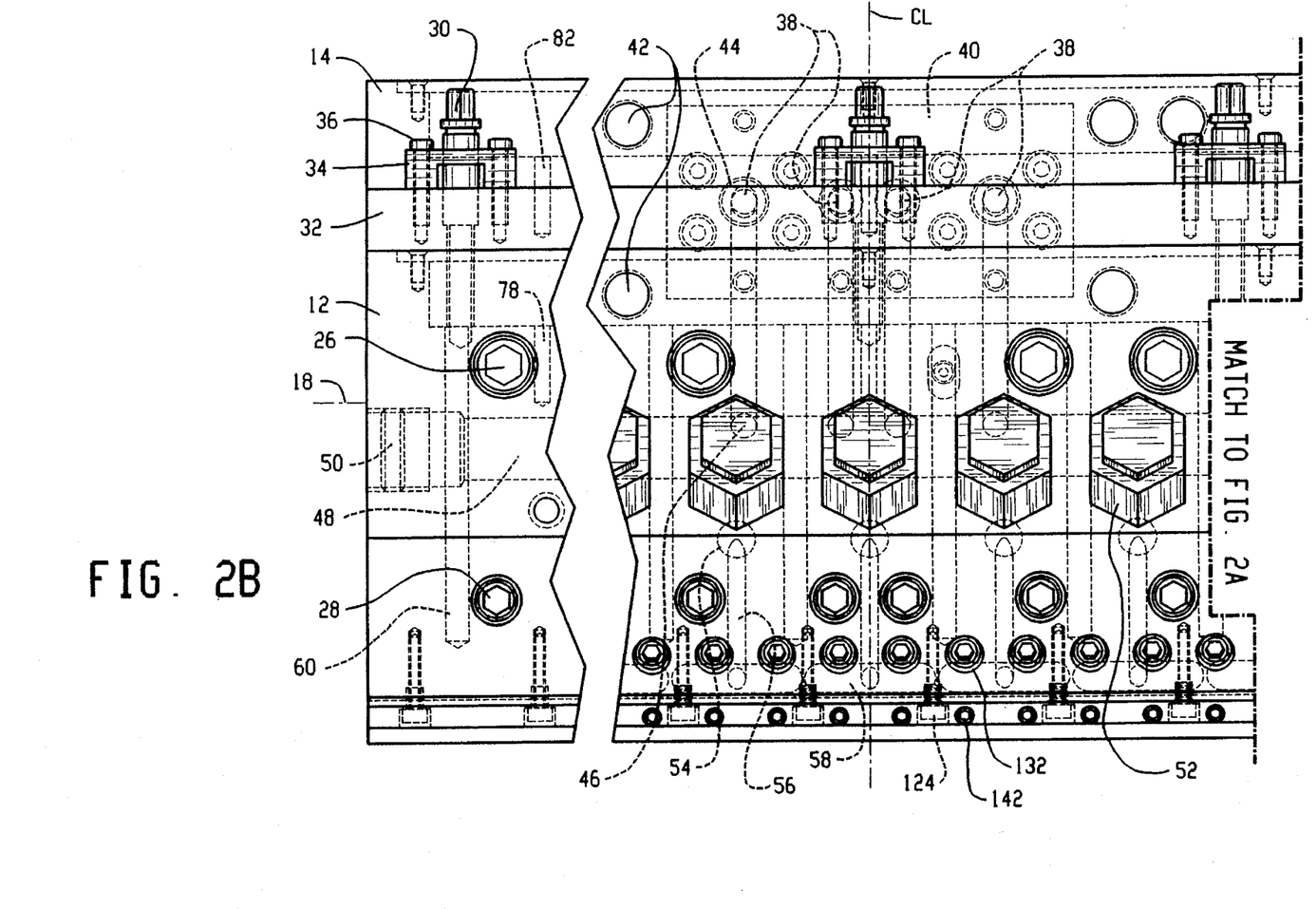
Figure 3A:
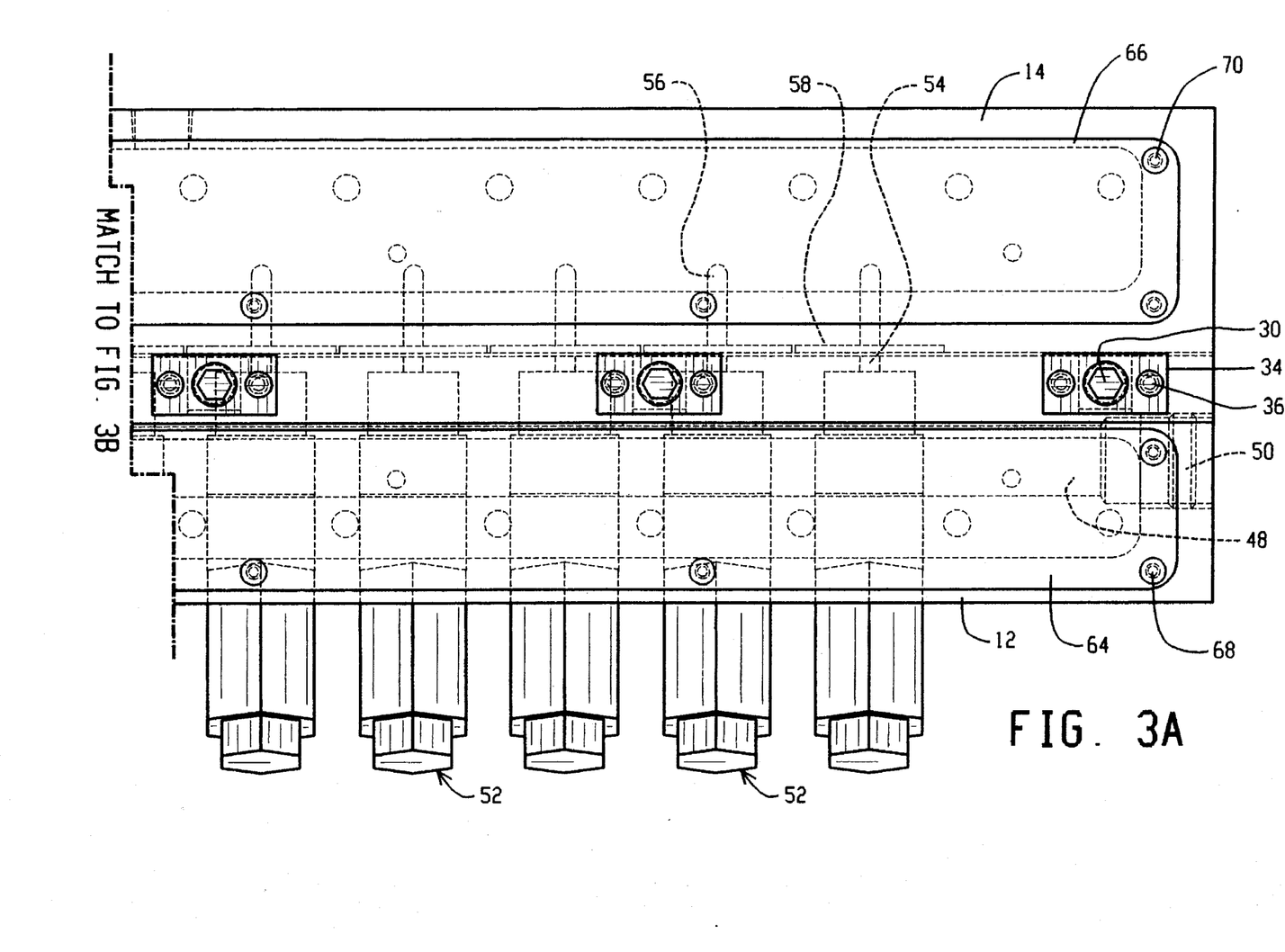
FIGS. 3A and 3B, taken together, form a back view of the adjustable slot coating die of FIG. 1.
Figure 3B:
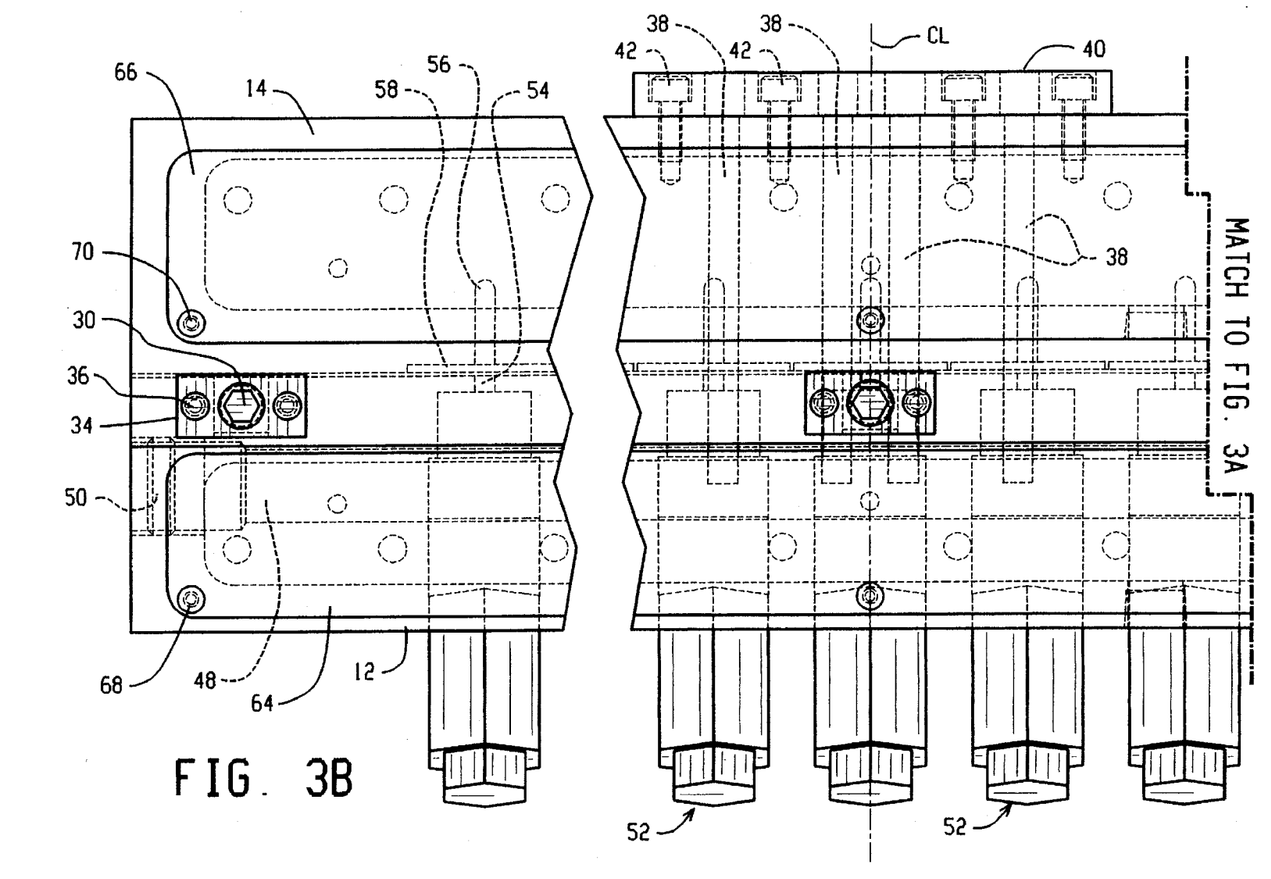
Figure 4A:
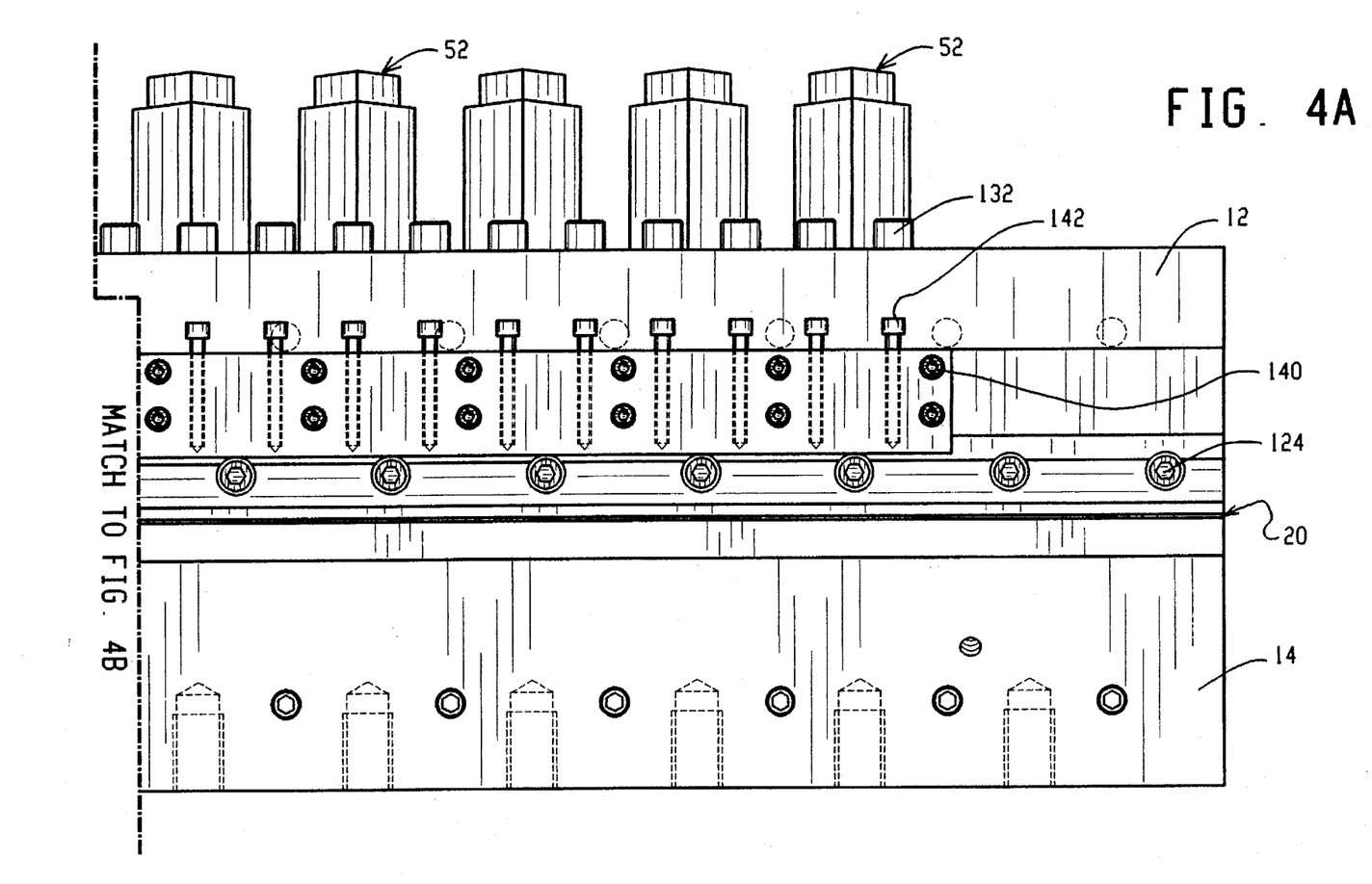
FIGS. 4A and 4B, taken together, form a front view of the adjustable slot coating die of FIG. 1.
Figure 4B:
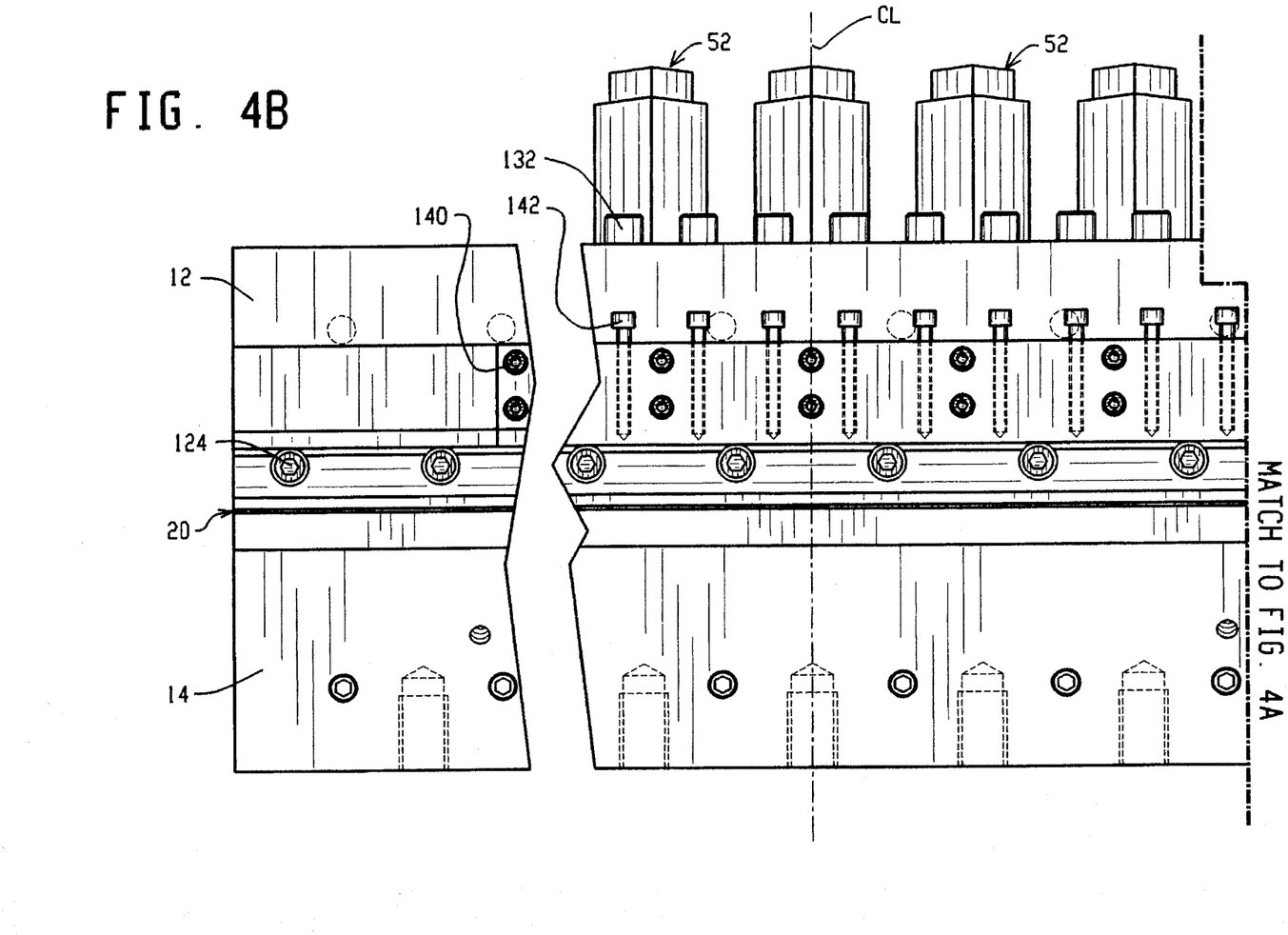

The upper and lower halves of the die are disposed in a generally parallel relationship with respect to one another along an end-to-end axis 18 of the die which lies in the plane of the shim 16 separating the die halves (see FIGS. 2A–2B). The distance separating the upper and lower die halves, which is provided by the predetermined thickness of the shim 16, forms a die opening 20. The die opening 20 extends substantially the entire end-to-end (i.e. cross-web) width of the die in the direction of the axis 18, and provides the means by which hot melt material may be dispensed by or extruded through the die. The term "hot melt material", as used broadly herein, includes thermoplastic adhesives, thermoplastic resins, reactive adhesives such as polyurethanes (PUR), high performance adhesives, and other materials having a softening or melting point above 100 degrees F.

The die opening 20 is located at the front of the die, which is designed to face a substrate to be coated with hot melt material. The front of the upper die half 12 is provided with a fixed insert (i.e. mouthpiece) 22 which, along with the front of the lower die half 14 forms the opening 20. The mouthpiece 22 is provided with mouthpiece adjustment means 23 which are shown in more detail in FIG. 6. The frontmost portion of the mouthpiece 22 forms a doctoring surface 24 which works, or doctors, the finish and thickness of the hot melt material as it is being applied to the substrate.

The upper and lower die halves are connected by means of threaded body bolts 26 and 28, the heads of which are shown in FIGS. 2A–2B. FIGS. 2A and 2B provide a broken view of the of a side view of the upper die half. The missing portion of the die not shown in FIG. 2B may be ascertained from FIG. 2A, as the die is symmetrical about die centerline $C_L$ (with the exception of a single alignment key as will be explained later). As shown in FIGS. 2A and 2B, a plurality of each of the threaded body bolts 26, 28 are positioned along the end-to-end width of the die to secure the upper and lower die halves together. Although only a broken view is shown in FIGS. 2A and 2B, in one preferred embodiment of the invention eighteen bolts 26 and sixteen bolts 28 are provided for this purpose. Each of these bolts passes entirely through the upper die half 12 and partially through the lower die half 14. The bolts are tightened to secure the die halves together.

A series of push-pull bolts 30 are located along the back of the die 10 (opposite the front), also running along the end-to-end width of the die. The push-pull bolts are used to adjust the relative position of the upper half of the die with respect to a substrate to be coated along the width of the die. Because the position of the mouthpiece 22 is fixed with respect to the upper die half 12, adjustment of the push-pull bolts 30 also adjusts the position of the mouthpiece with respect to substrate along the entire end-to-end width of the die.

The push-pull bolts 30 are mounted to a projection or lug 32 in the lower die half by means of a bracket 34 and mounting screws 36. The mounting screws 36 pass only through the bracket 34 and into the lug 32, and therefore the position of the bracket is fixed with respect to the lower die half 14. The push-pull bolts 30, however, pass entirely through the lug and into the body of the upper die half 12. As is known in the die-making art, threads in the lug 32 and in the upper die half 12 are cut such that rotation of a particular push-pull bolt 28 in one direction pushes the upper die half away from the lug, and rotation in an opposite direction pulls the upper die half toward the lug. To facilitate this manner of adjusting the positions of the upper and lower die halves with respect to each other along the end-to-end width of the die, the body bolts 26, 28 are slightly loosened before adjusting the push-pull bolts 30 and then re-tightened after adjustment of the push-pull bolts is completed.

In one preferred embodiment of the die 10, seven push-pull bolts 30 are located along the end-to-end width of the die. Selective and independent operation of individual push-pull bolts 30 may effect a coarse adjustment of the contour of the doctoring surface 24 of the mouthpiece 22 along the entire end-to-end width of the front of the die. Such adjustment of the doctoring surface is necessary to accommodate variations in the thickness of the substrate being coated, or in the surface of a back-up roll (not shown) over which the substrate passes during the coating process, or to accommodate manufacturing variations in the uniformity of either or both the upper die half 12 or the mouthpiece itself.

Referring back to FIG. 1, the path by which hot melt material flows through the die 10 to the die opening 20 is shown in phantom. A supply of hot melt material (not shown) is provided to the lower die half 14 by means of four input lines (also not shown). Of course, other input line configurations comprising more or less than four lines are contemplated. A filter may be provided at the end of the lines nearest the die for filtering impurities and particulate matter from the supply of hot melt material. These four input lines mate with four corresponding tubular channels 38 which are machined or drilled into the lower die half 14 and which extend transversely throughout the entire lower die half. The input lines and the filter are attached to the lower half of the die by means of a filter base plate 40 by means of eight threaded screws 42. Seals such as Teflon 0-rings 44 (FIG. 2B) are provided at the interface of the filter base plate and the entrance of each of the tubular channels 38 in the lower die half to prevent leakage of the hot melt material at this interface.

The hot melt material flows through the four tubular channels 38 and into four corresponding tubular channels 46 which are machined or drilled into the upper die half 12. The four tubular channels 38 and corresponding tubular channels 46 are aligned with each other by the bolts 26, 28 which secure the upper and lower die halves together, and by additional alignment mechanisms described later herein. The tubular channels 46 extend horizontally from the upper die half-lower die half interface to a cylindrical cross channel 48 in the upper die half 12. The cross channel 48 extends the entire width of the upper die half and communicates with each of the four tubular channels 46. Caps 50 are provided to seal the ends of the cross channel to protect hot melt material contained therein from the outside environment.

The hot melt material provided to the cross channel 48 by the tubular channels 46 pass through a series of adjustable flow control valve assemblies 52 in the upper die half 12. Each of the valve assemblies taps into the supply of hot melt material in the cross channel 48 and regulates the flow of hot melt material exiting the valve assembly at a corresponding exit port 54 in the upper die half 12. Fifteen such valve assemblies are provided in one preferred embodiment of the invention (shown in more detail in FIGS. 7–10). The fifteen corresponding exit ports 54 in the upper die half 12 align with fifteen corresponding elbow-channels 56 which are machined or drilled in the lower die half 14. Of course, other valve assembly/exit port configurations comprising more or less than 15 valves/port combinations are contemplated. The number of valve/port combinations depends on the particular application, and is chosen to provide the required uniformity of the hot melt material.

Figure 5A:
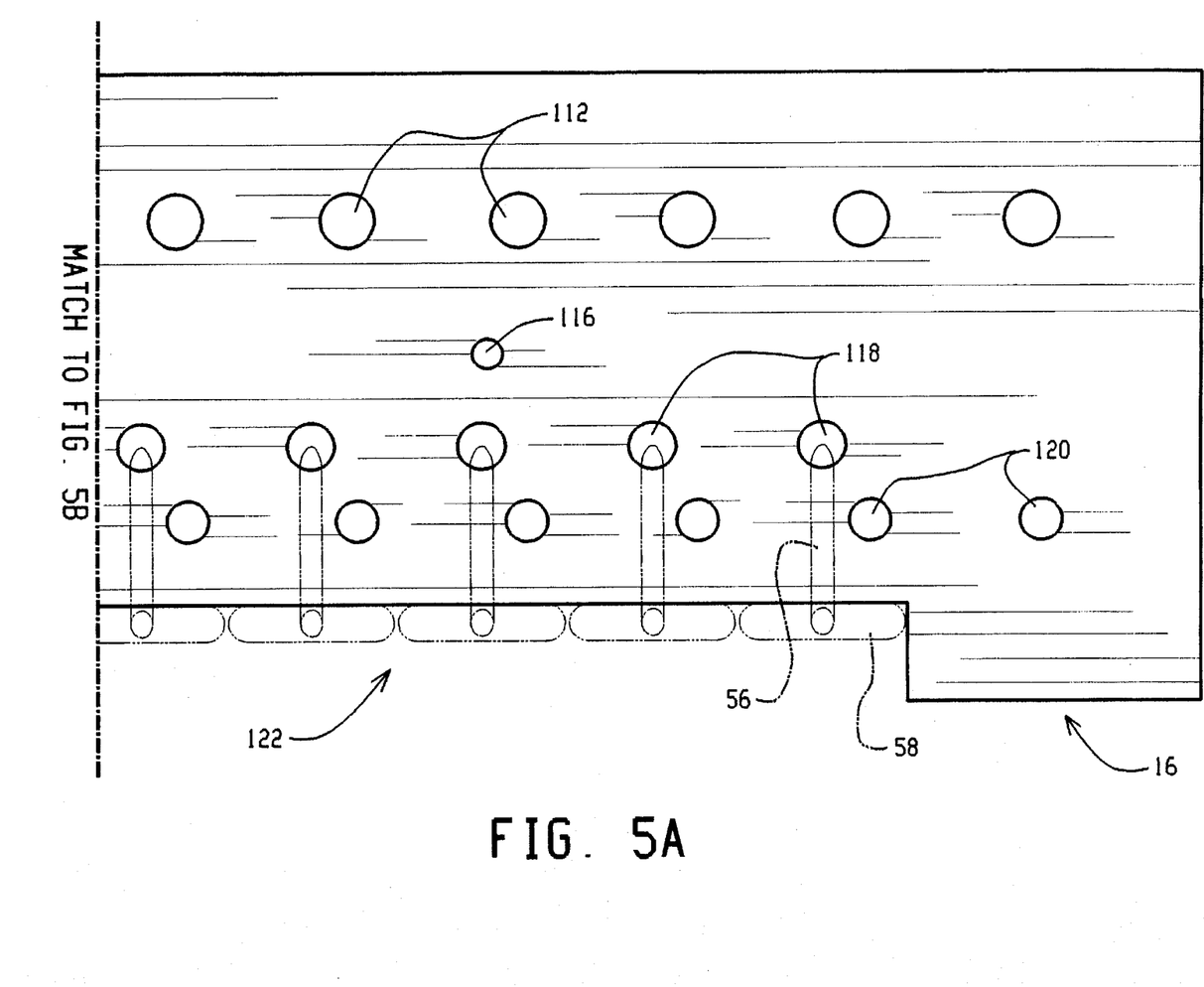
FIGS. 5A and 5B, taken together, form a side view of the shim disposed between the upper and lower die halves of the slot coating die of FIG. 1.
Figure 5B:
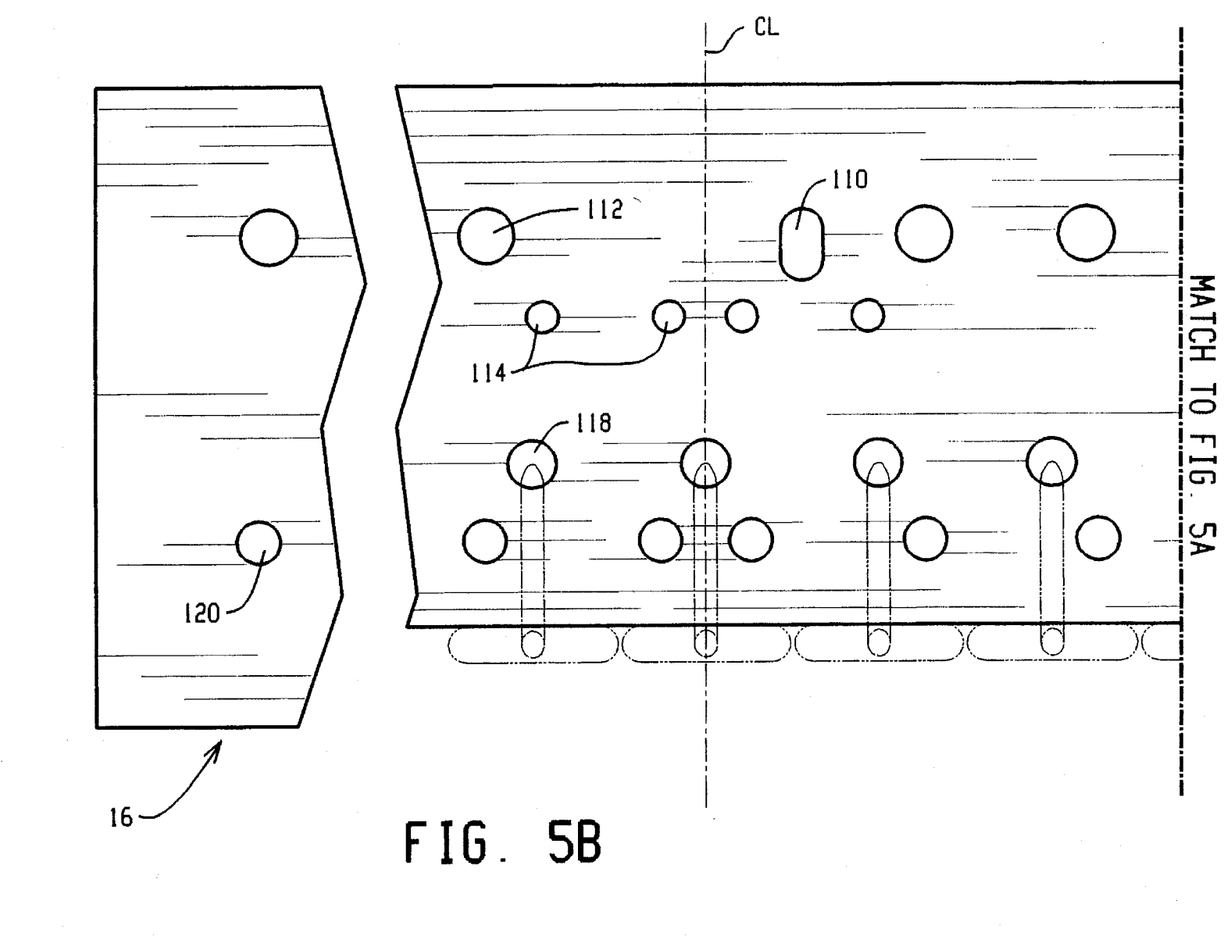

Each of the elbow-channels 56 in the lower die half 14 is L-shaped and terminates in an elongated slot 58 with rounded ends which is machined in an inner flow surface of the lower die half, facing the shim 16. The entrance angle of the elbow-channels 56 to the elongated slots 58 is between 45 and 135 degrees, and preferably about 90 degrees, to insure even flow of hot melt material therethrough. The fifteen slots 58 extend in the direction of the axis 18 on either side of the elbow-channels 56. Each slot 58 and the portion of each elbow-channel nearest the groove form a T-shape (hence the term "T-slot" die). Hot melt material flows from the elbow-channels, through the series of adjacent T-slots formed by the grooves 58, and through the die opening 20 to provide an evenly distributed flow of hot melt material across the opening. As explained later herein with reference to FIG. 5, the shim 16 provides means by which the flow of hot melt material present at the T-slots may be selectively blocked to provide a predetermined pattern or variable width of hot melt material flow at the die opening 20.

In order to insure that the hot melt material flows smoothly and consistently through the upper and lower die halves, heater cartridges 60, 62 are installed in cylindrical cavities in each of upper and lower die halves, respectively. In one preferred embodiment, eighteen cartridge heaters are installed in eighteen corresponding cavities in each of the upper and lower die halves.

The heater cartridges 60, 62 are connected to appropriate power wires in wiring boxes 61 and 63 which are covered by cover plates 64 and 66, respectively. Cover plate 64 is secured to the upper die half by screws 68 and cover plate 66 is secured to the lower die half by screws 70 (see also FIGS. 3A–3B). Electrical wiring is run to the heater cartridges 60 by means of flexible conduit 72, and to the heater cartridges 62 by means of flexible conduit 74. Heat is radiated from each of the heater cartridges 60 throughout the upper die half 12, and temperature is sensed by a thermocouple sensor disposed in a corresponding thermocouple channel 78. Heat is radiated from each of the heater cartridges 62 throughout the lower die half 14, and temperature is sensed by a thermocouple sensor disposed in a corresponding thermocouple channel 82. Plugs 84 are provided at each of the front ends of the heating cartridges 62.

On the upper die half 12, threaded holes 94 are provided for die mounting purposes. In addition, one or more eye bolts 96 may be provided on brackets 98 attached to the upper die half by means of threaded bolts 100. The eye bolts 96 enable the die to be easily transported by hoisting machinery. The brackets 98 may also be provided with mounting holes 102. Finally, with respect to FIG. 1, a pair of set screws 104 are accessed by means of access holes 106 drilled into to the upper die half 12. The set screws 104 are used to separate the die halves from one another upon disassembly of the die 10 by turning the set screws 104 clockwise, thereby forcing the set screws against the body of the lower die half 14 at the location of recess 108 to separate the die halves from one another.

FIGS. 3A–3B and 4A–4B form back and front views, respectively, of the adjustable slot coating die described above. Each of the elements shown in these Figures has been previously discussed, or, with respect to the mouthpiece adjustment means 23, will be discussed in more detail with reference to FIG. 6. Like FIGS. 2A–2B, FIGS. 3A–3B and 4A–4B are symmetrical about the die centerline $C_L$.

FIGS. 5A–5B form a side view of the shim 16 disposed between the upper and lower die halves. Again, with the exception of an oval-shaped hole 110 (FIG. 5B), the shim is symmetrical about die centerline $C_L$. Working down the shim 16 from the back (top of page) to the front (bottom of page), holes 112 are provided which align with body bolts 26 (for a better understanding of holes 112–120, refer back to FIG. 1). Four holes 114 (FIG. 5B) are provided which align with the tubular channels 38 in the lower die half 14 and the tubular channels 46 in the upper die half 12. A pair of holes 116 (FIG. 5A) are provided through which alignment dowels may be inserted. Holes 118 are provided which align with the exit ports 54 in the upper die half 12 and the elbow-channels 56 in the lower die half 14. Lastly, holes 120 are provided which align with body bolts 26.

The T-slots formed by the slots 58 and the elbow-channels 56 are shown in phantom in FIGS. 5A–5B. As explained above with reference to FIG. 1, the shim 16 may also provide means by which the flow of hot melt material present at the T-slots may be selectively blocked to provide a predetermined pattern or variable width of hot melt material flow at the die opening 20. As shown in FIGS. 5A–5B, none of the T-slots is blocked. Thus, the shim plate configuration shown, in which a single continuous slot extension 122 at the front of the shim exposes each of the T-slots to the die opening 20, provides a continuous, evenly distributed flow pattern from one end of the die to the other. The number and width of the slot extensions determines the flow pattern of the hot melt material which is applied to the substrate through the opening 20. Virtually any type of flow pattern is possible with the die 10 merely by replacing the shim 16.

Figure 1:
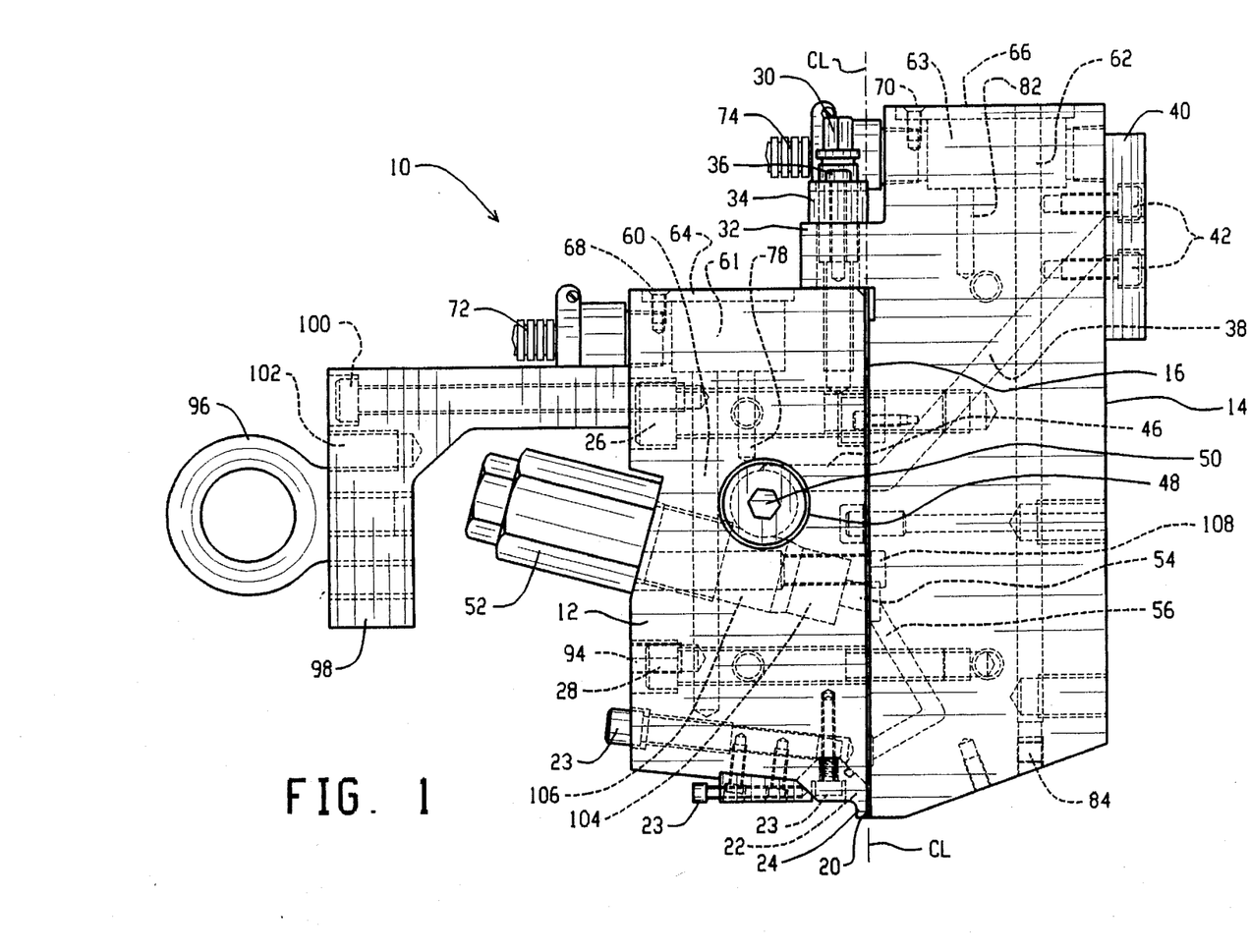
FIG. 1 is an end view of an adjustable slot coating die constructed according to the principles of the present invention, showing upper and lower die halves.
Figure 6:
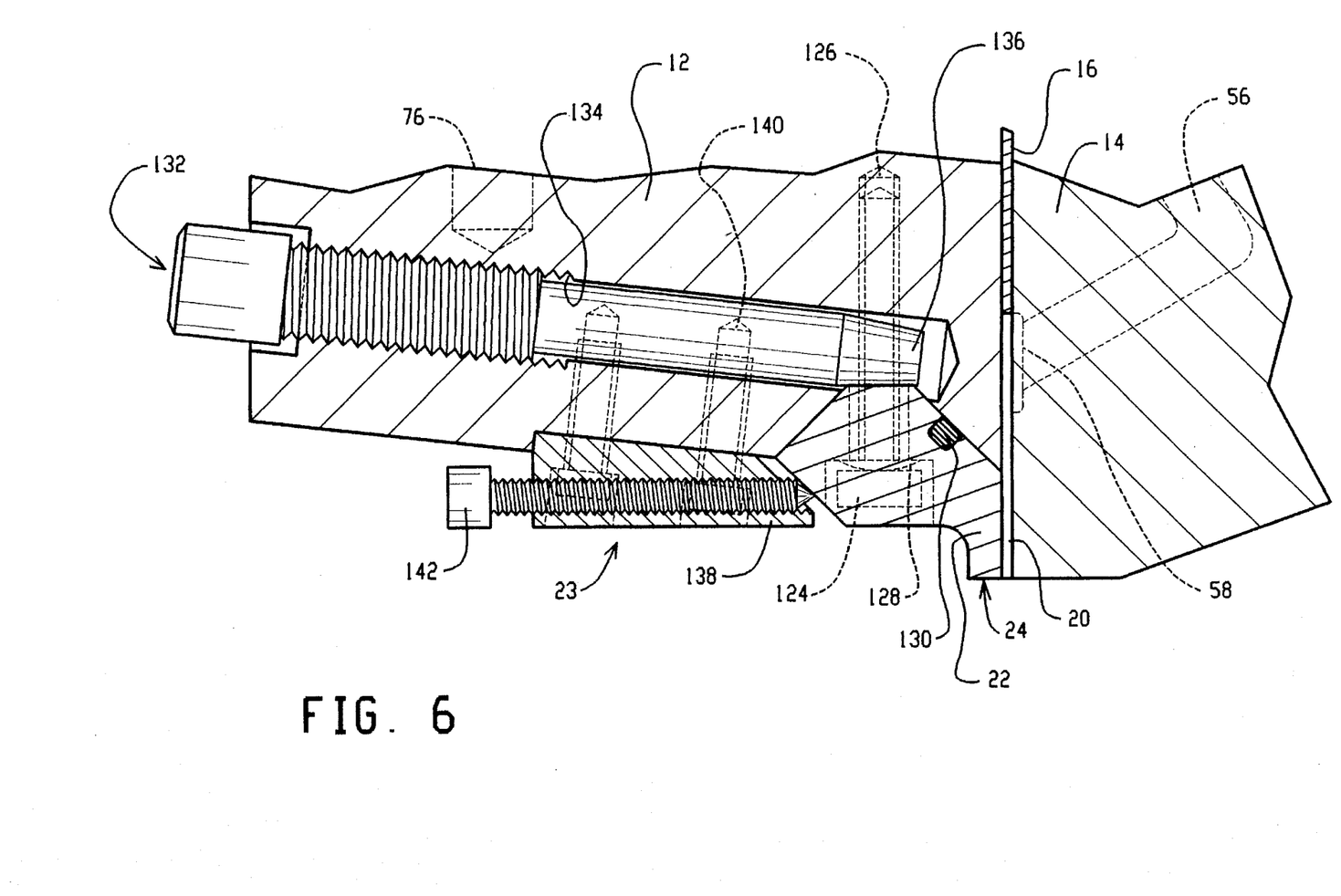
FIG. 6 is a detailed, partial sectional view of the end of the slot coating die of FIG. 1.

The mouthpiece adjustment means 23 referenced in FIG. 1 is shown in greater detail in FIG. 6. The mouthpiece 22 is secured to the upper die half 12 by means of a series of threaded screws 124 which are screwed into corresponding threaded holes 126 evenly spaced along the end-to-end width of the die. A spring 128 such as a Belleville washer surrounds the shaft of each of the screws 124 between the head of the screw and the mouthpiece 22. Thus, when a screw 124 is tightened to an extent that the spring 128 is under compression, the compressive force exerted by the spring forces the mouthpiece 22 into contact with the upper die half 12 at that particular location. A long, thin cylindrical elastomer strip 130 extends the entire end-to-end width of the die and provides a seal between the mouthpiece 22 and the upper die half 12.

A series of tapered screws 132 are provided for a series of corresponding threaded holes 134 in the upper die half 12. The tapered screws 132 are used to finely adjust the position of the mouthpiece 22 with respect to the surface being coated along the end-to-end width of the die. Tapered ends 136 of the screws mate with the mouthpiece. By turning a screw 132 clockwise, the screw is drawn further into the upper die half 12, and the tapered end of the screw overcomes the compressive force of the spring 128 and forces the mouthpiece 22 away from the upper die half at that particular location. The range of fine adjustment of the mouthpiece at each screw location is limited by the respective configurations of the spring 128 in its fully loaded and unloaded states.

The mouthpiece mounting screws 124 are tightened until each of the springs 128 enters a state of compression, thereby forcing the mouthpiece 22 into contact with the upper die half 12 along the entire end-to-end width of the die. Once a coarse adjustment of the contour of the doctoring surface 24 of the mouthpiece 22 along the entire width of the front of the die is effected by selective operation of the individual push/pull bolts 30, as described above, fine adjustment of the doctoring surface may be accomplished as follows. The tapered screws 132 may be selectively and independently tightened to adjust the doctoring surface 24 of the mouthpiece 22 along the entire width of the die.

Once the fine adjustment of the doctoring surface 24 is complete, a series of optional locking clamps 138 may be installed on the front of the upper die half 12 by means of screws 140. The clamps 138 provide additional rigidity for die at the location of the mouthpiece 22. A locking screw 142 in each clamp is then tightened to lock the position of the mouthpiece 22 with respect to the upper die half 12 along the width of the die.

Figure 7:
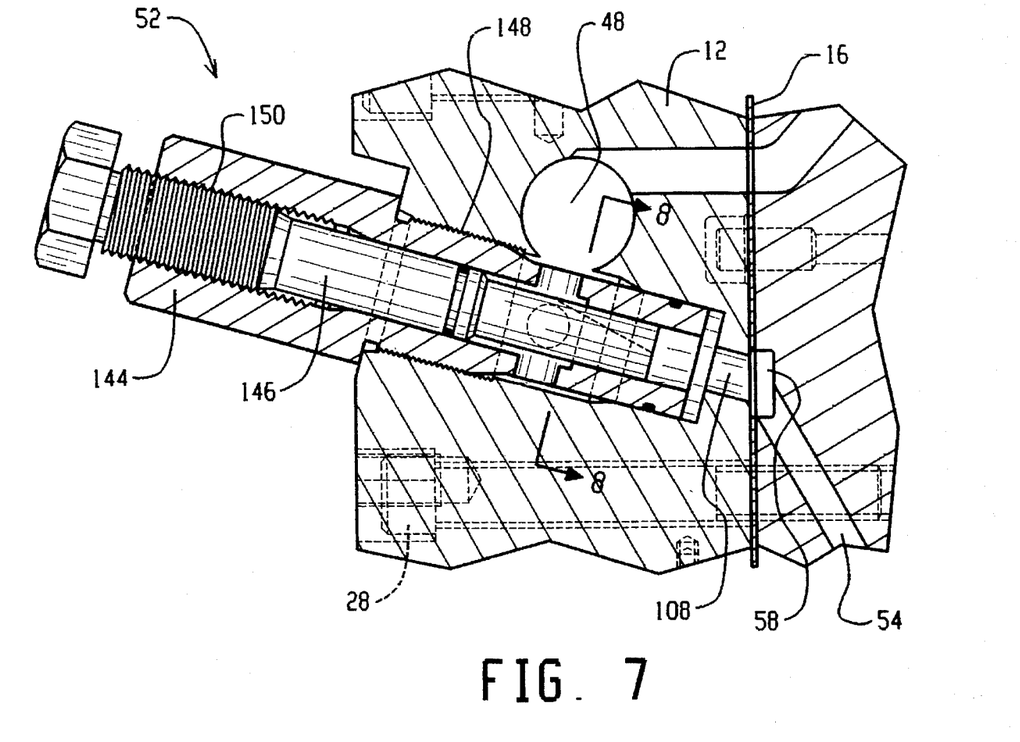
FIG. 7 is a first detailed, partial sectional end view of a flow control valve assembly forming part of the upper die half of the slot coating die of FIG. 1.
Figure 8:
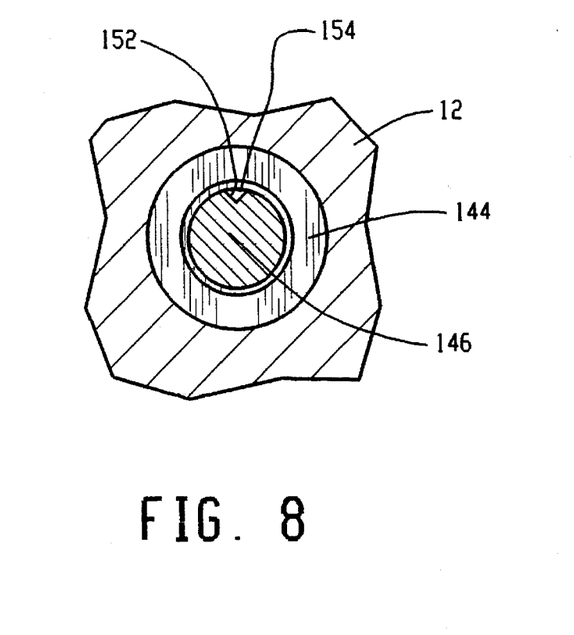
FIG. 8 is a detailed, partial sectional view of the valve assembly of FIG. 7, taken along the line 8—8.
Figure 9:
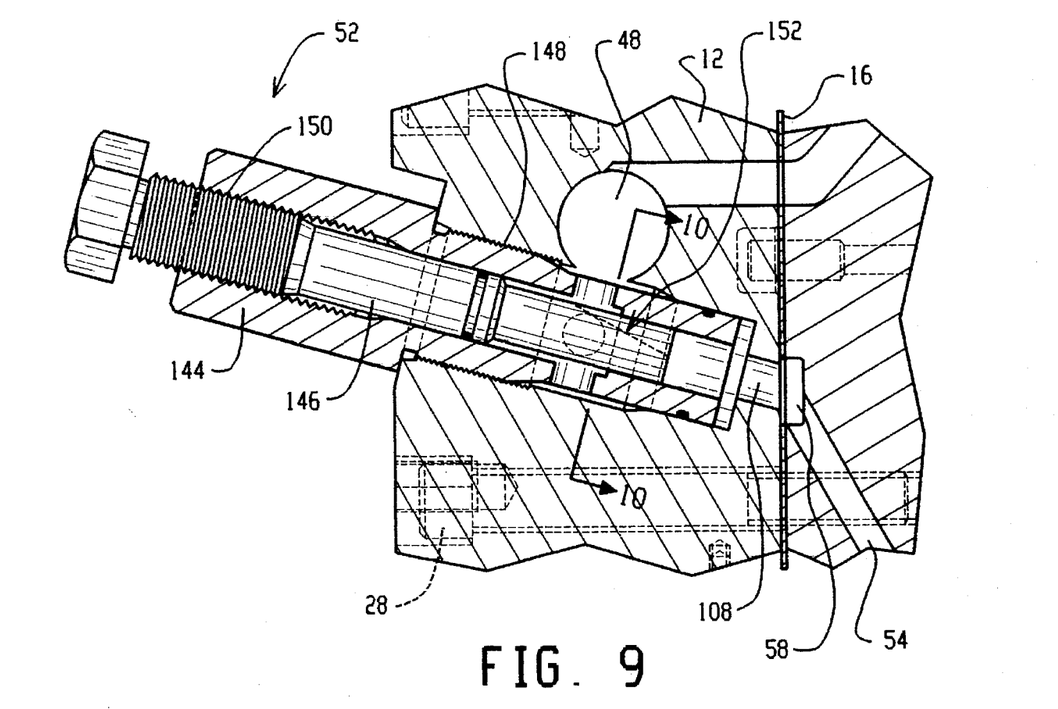
FIG. 9 is a second detailed, partial sectional end view of a flow control valve assembly forming part of the upper die half of the slot coating die of FIG. 1, showing the valve in a more open configuration than that shown in FIGS. 7 and 8.

FIGS. 7–10 show the construction of the adjustable flow control valve assemblies 52 in more detail. As shown in FIGS. 7 and 9, the valve assemblies 52 each comprise a valve body 144 and a spool 146 which fits inside the body. The position of the body 144 is fixed within the upper die half 12 by a threaded coupling 148. The spool is made movable in and out of the body 144 by means of a threaded coupling 150 which enables the spool to be drawn into and out of the body 144.

The spool 146 is provided with a V-notch 152 which communicates with the cross channel 48. Hot melt material flows from the cross channel 48, through an opening 154 formed by the V-notch 152, and into the exit port 108 associated with that valve assembly. The flow rate is metered by the effective cross sectional area of the opening 154 which is in communication with cross channel, as determined by the position of the spool 146 within the body 144.

Figure 10:
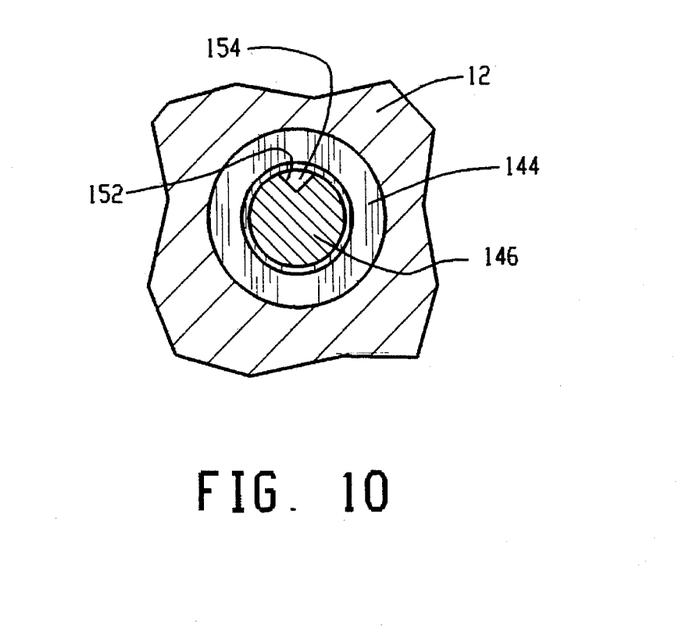
FIG. 10 is a detailed, partial sectional view of the valve assembly of FIG. 9, taken along the line 10—10.

FIGS. 8 and 10 show the effective cross sectional area of the opening 154, based on the positions of the spool 146 within the body 144 as shown by FIGS. 7 and 9, respectively. As shown in FIG. 8, the cross sectional area of the opening 154 is relatively small because the spool is drawn well inside the body, thereby reducing the effective cross sectional area of the opening 154 which is in communication with cross channel 48. As shown in FIG. 10, the cross sectional area of the opening 154 is larger than that shown in FIG. 8 because the spool is withdrawn further outside the body, thereby increasing the effective cross sectional area of the opening 154 which is in communication with cross channel 48. In this manner, the valve assemblies 152 may be individually adjusted to regulate the flow of hot melt material which is eventually supplied to the die opening.

Accordingly, the preferred embodiment of an adjustable slot coating die has been described. With the foregoing description in mind, however, it is understood that this description is made only by way of example, that the invention is not limited to the particular embodiments described herein, and that various rearrangements, modifications and substitutions may be implemented without departing from the scope of the invention as hereinafter claimed.

We claim:

1. A slot coating die (10), comprising:
   an upper die half (12) and a lower die half (14) attached together, each die half (12, 14) extending along an axis (18) and having a front and a back, said front of said upper die half including a movable lip insert (22) extending substantially the entire width thereof, said movable lid insert being adjustable along substantially the entire length thereof, toward and away from said front of said upper die half in a direction generally perpendicular to said axis;
   at least one flow passage at least partially defined by said upper and lower die halves (12, 14) through which hot melt material is introducible; and
   at least one adjustable die opening (20) communicating with said flow passage near the fronts of the die halves, through which hot melt material introduced into the flow passage may exit the die, a thickness of said at least one adjustable die opening being defined at least partially by said lower die half and said movable lip insert and being adjustable independently of said movable lip insert.

2. A slot coating die (10), comprising:
   an upper die half (12) and a lower die half (14) attached together, each die half (12, 14) extending along an axis (18) and having a front and a back, said front of said upper die half including a movable lip insert (22) extending substantially the entire width thereof and movable with respect to said upper die half toward and away from said front of said upper die half in a direction generally perpendicular to said axis;
   at least one flow passage at least partially defined by said upper and lower die halves (12, 14) through which hot melt material is introducible;
   at least one adjustable die opening (20) communicating with said flow passage near the fronts of the die halves, through which hot melt material introduced into the flow passage may exit the die, said at least one adjustable die opening being defined at least partially by said lower die half and said movable lip insert and being adjustable independently of said movable lip insert; and
   a shim plate (16) disposed between said upper and lower die halves (12, 14), said shim plate at least partially defining said at least one adjustable die opening (20).

3. The slot coating die (10) of claim 2, wherein said shim plate (16) has a predetermined thickness, and said at least one adjustable die opening (20) has an adjustable thickness defined by a distance separating said upper and lower die halves (14, 16) at their respective fronts, said predetermined thickness of said shim plate defining said adjustable thickness of said at least one die opening.

4. The slot coating die (10) of claim 2, further comprising a coarse adjustment mechanism for adjusting the relative positions of the lower and upper die halves (12, 14) with respect to each other in a direction generally parallel to that in which said movable lip insert (22) is movable.

5. The slot coating die (10) of claim 4, wherein said coarse adjustment mechanism comprises a plurality of push-pull bolts (30) located near the back of the die and each extending at least partially through both the upper and lower die halves (12, 14).

6. The slot coating die (10) of claim 4, wherein said movable lip insert (22) is attached to said upper die half (12) by a plurality of spring (128) loaded screws (124) spaced along said width of said upper die half.

7. The slot coating die (10) of claim 6, further comprising a clamp (138) for securing the position of said movable lip insert (22) with respect to said upper die half (12).

8. The slot coating die (10) of claim 6, wherein said at least one flow passage extends at least partially through both upper and lower die halves (12, 14), and said upper and lower die halves are provided with heater cartridges (60, 62) for maintaining the fluidity of the hot melt material flowing therein.

9. A slot coating die (10), comprising: an upper die half (12) and a lower die half (14) attached together, each die half (12, 14) extending along an axis (18) and having a front and a back, said front of said upper die half including a movable lip insert (22) extending substantially the entire width thereof and movable with respect to said upper die half toward and away from said front of said upper die half in a direction generally perpendicular to said axis;

a plurality of flow passages at least partially defined by said upper and lower die halves (12, 14) through which hot melt material is introducible;

at least one adjustable die opening (20) communicating with said flow passages near the fronts of the die halves, through which hot melt material introduced into the flow passages may exit the die, said at least one adjustable die opening being defined at least partially by said lower die half and said movable lip insert and being adjustable independently of said movable lip insert; and     a control valve (52) located within each of said flow passages for balancing the flow of hot melt material provided to each of a plurality of flow passage exit apertures (58) by said control valves.

10. The slot coating die (10) of claim 9, further comprising a generally cylindrical cross channel (48) which extends substantially the entire width of said upper die half (12), said cross channel communicating with said control valves (52) and said plurality of flow passages.

11. The slot coating die (10) of claim 3, wherein said at least one die opening (20) comprises a plurality of die openings each of which is defined by said lower die half, said movable lid insert, and a slot (122) formed in said shim plate (16), said plurality of slots thereby in part defining said plurality of die openings.

12. The slot coating die (10) of claim 11, wherein said slots (122) in said shim plate (16) communicate directly with T-shaped portions (56, 58) of said flow passage.

13. A lip insert adjustment mechanism (23) for adjusting the position of a removable lip insert (22) with respect to the front of a coating die (10) to which it is attached, the coating die extending along an axis (18), the removable lip insert being movable toward and away from the front of the die in a direction generally perpendicular to the axis, said lip insert adjustment mechanism comprising:

a plurality of spring (128) loaded screws (124) spaced along said front of said die at spaced apart locations along the width thereof, wherein a compressive force exerted by each of said springs forces the lip insert toward the die at that particular spaced apart location; and     a corresponding plurality of tapered screws (132) at said spaced apart locations, each tapered screw having a tapered portion (136) in contact with said lip insert, wherein rotation of each of said tapered screws in one direction counteracts said compressive force exerted by a corresponding spring to force the lip insert away from the die at that particular spaced apart location.

14. The lip insert adjustment mechanism (23) of claim 13, further comprising a clamp (138) for securing the position of said removable lip insert (22) with respect to said die (10).

15. The lip insert adjustment mechanism (23) of claim 14, further comprising a locking screw (142) in each clamp (138).

\* \* \* \* \*

UNITED STATES PATENT AND TRADEMARK OFFICE
CERTIFICATE OF CORRECTION

PATENT NO. : 5,622,315
DATED : April 22, 1997
INVENTOR(S) : Keane, et al.

It is certified that error appears in the above-indentified patent and that said Letters Patent is hereby corrected as shown below:

col. 8, line 8, delete "lid" and insert --lip-- col. 10, line 2, delete "lid" and insert --lip--

Signed and Sealed this

Eighth Day of July, 1997

Attest:

BRUCE LEHMAN

*Attesting Officer*   *Commissioner of Patents and Trademarks*

UNITED STATES PATENT AND TRADEMARK OFFICE
CERTIFICATE OF CORRECTION

PATENT NO. : 5,622,315
DATED : April 22, 1997
INVENTOR(S) : Keane et al

It is certified that error appears in the above-indentified patent and that said Letters Patent is hereby corrected as shown below:

On the title page: Item [54] and Column 1, line 1, should read -- ADJUSTABLE SLOT COATING DIE--.

Signed and Sealed this

Sixteenth Day of September, 1997

Attest:

BRUCE LEHMAN

Attesting Officer

Commissioner of Patents and Trademarks